Dec. 4, 1956 S. LINDEN 2,772,423
COMBINATION BASSINET CAR BED
Filed March 24, 1953 2 Sheets-Sheet 1

Inventor
Samuel Linden
by Roberts, Cushman & Grove
att'ys.

Inventor
Samuel Linden
by Roberts, Cushman & Grove
Att'ys.

United States Patent Office 2,772,423
Patented Dec. 4, 1956

2,772,423

COMBINATION BASSINET CAR BED

Samuel Linden, Swampscott, Mass., assignor to Bunny Bear Inc., Everett, Mass., a corporation of Massachusetts Application March 24, 1953, Serial No. 344,384

3 Claims. (Cl. 5—94)

This invention relates to beds for babies and more especially to portable beds.

The conventional bassinet is a rather elaborate wicker basket having in some instances foldable legs for supporting it and handles for carrying it from place to place. While bassinets of this kind can be placed in the back of a car by folding the legs and resting it directly on the back seat, this is not wholly satisfactory because it takes up the entire back seat, depriving others of using it. Moreover a bassinet can not be placed on the floor between the front and back seats because of its bulkiness. The conventional car bed has short legs which rest on the back seat and suspension arms which hook over the back of the front seat. The shortness of the legs, however, makes it objectionable for temporary use indoors as a bassinet because it is too close to the floor and hence subject to drafts, the possible danger of domestic animals annoying the baby, and the inconvenience of having to bend over and to assume a very awkward position in tending to the baby.

The principal object of this invention is to provide a portable baby bed which may be employed either as a bassinet indoors or as a car-bed for travel. A further object is to provide a combination bassinet and car bed which will stand at normal height when used indoors and may be placed between the front and back seats of a car without taking up the back seat or the space normally required for the knees of one sitting in the back seat. A still further object is to provide a convertible bassinet and car bed which is of durable, sturdy construction, which may readily be converted for use from a bassinet to a car bed or vice versa, which will be stable and safe for use as a bassinet, which is provided with arms for supporting it in the car in either transverse or longitudinal positions, and which may easily be carried to and from the car.

As herein illustrated the bed has a rectangular frame made of metal bar stock on which is suspended a fabric hammock of conventional design for receiving a mattress or sectional pad. If required a stiff fiberboard may be placed between the mattress or pad to keep it flat, especially where, in the present case, the bed is of large overall size. Legs are attached to the frame on suitable pivots to permit folding beneath the bed in the event that it is to be stored when not in use, and toggle braces are connected between the frame and legs to hold the legs perpendicular to the frame when the latter are in their operative positions. The legs have articulated upper and lower sections, and the sections are normally held, when the bed is to be used as a bassinet, in alignment by locking elements cooperable with the sections in a manner to prevent folding of the sections with respect to each other. The aligned sections support the bed at normal bassinet level. The lower sections of the legs are foldable upwardly by retracting the locking means, to shorten the effective length of the legs, and, when folded upwardly, the bed may be supported on the lower ends of the upper sections. The folding is primarily intended to permit carrying the bed from indoors to a car and to facilitate placing the bed in a car between the front and back seats. As folded the lower ends of the lower sections are brought into substantial vertical position, the lower portions thereof now being uppermost and providing carrying handles for use in carrying the bed to and from the car. In the car the bed may be placed longitudinally by restoring one of the folded lower leg sections at one end to its extended position so as to rest on the floor and leaving the other lower leg section folded so that it rests on the back seat. Arms are employed at one end of the bed for engagement with the back of the front seat to steady the bed in this position. When used transversely of the car both legs are folded and the arms are transferred from the end to the side of the frame for supporting the bed from the back of the front seat. The lower sections of the legs may be folded inwardly beneath the bed. Preferably, however, they are folded outwardly and upwardly since in this position they leave the space beneath the crib unobstructed so that those seated in the back seat have knee room, and as thus folded they are then in carrying position so that the bed easily can be removed from the car. The arms are transferrable from an end to a side of the bed, that is, both arms may be detached from an end and transferred to a side or vice versa, or one arm may be swung without removal from a position perpendicular to an end to a position perpendicular to the adjacent side, and the other arm may be removed from its position to the diagonal corner and placed there so as to pair it with the first arm.

The invention will now be described in greater detail with reference to the accompanying drawings wherein:

Fig. 1a is a perspective view of one form of means for detachably attaching the arms to the frame;

Fig. 1b is a fragmentary, perspective view near one corner of the frame showing alternative means for detachably attaching the arms to the frame;

Figure 1:
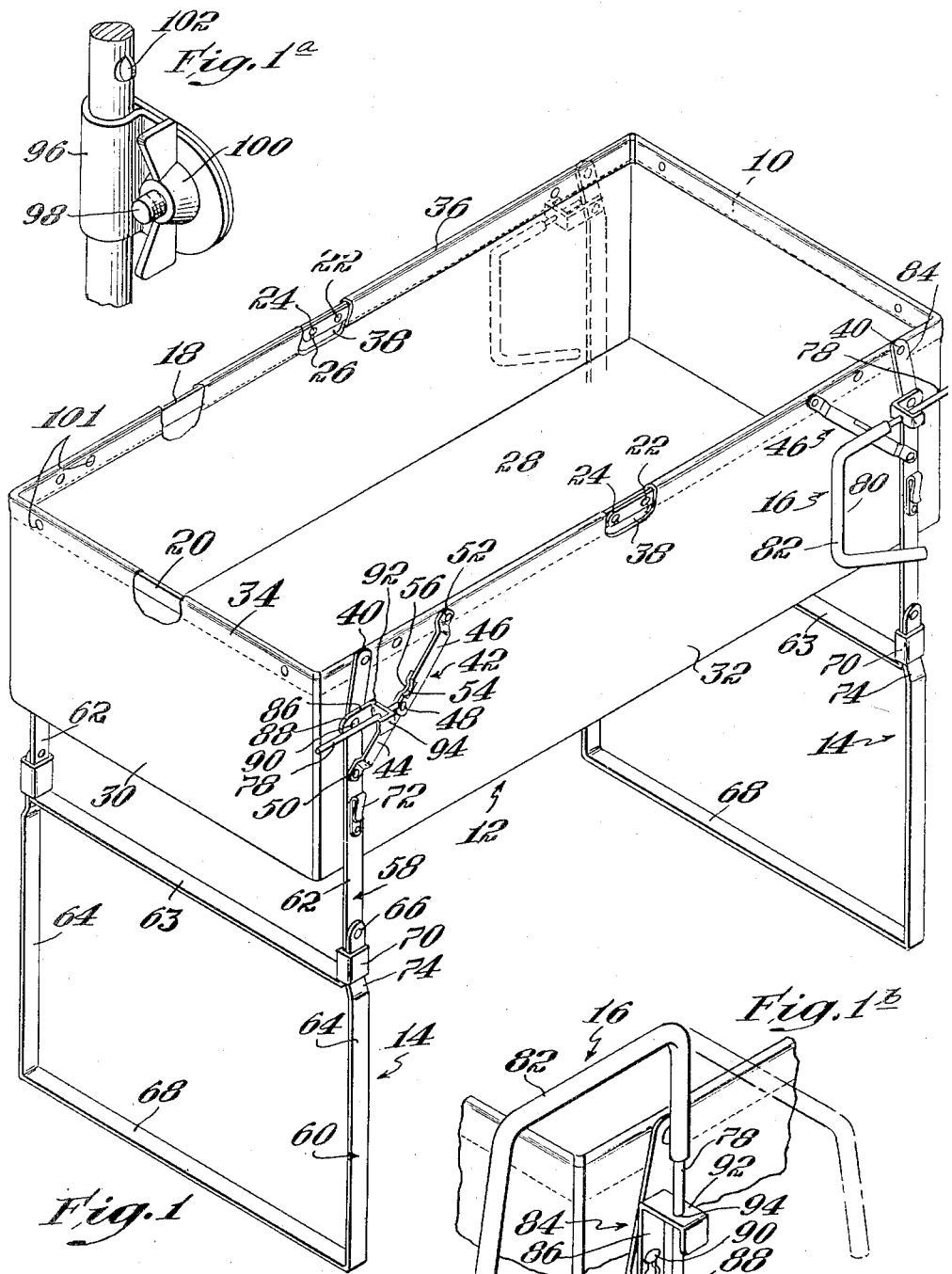
Fig. 1 is a perspective view of the combination bassinet and car bed used as a bassinet.

Referring to the drawings, the combination bassinet and car bed comprises essentially a frame 10, hammock 12 suspended therefrom, legs 14, and arms 16.

The frame 10 is substantially rectangular, being comprised of flat metal stock, having side rails 18—18 and end rails 20—20. The side rails 18—18 are joined substantially midway between their ends by pivot pins in the form of rivets 22—22, and are locked in alignment by pins in the form of lugs 24—24 which engage downwardly facing notches 26—26, the latter being formed in the lower edges of the rails 18—18. Preferably an end rail 20 and one-half of each side rail 18 is formed of a single piece of stock so as to provide a rigid, substantially U-shaped piece, although it is to be understood that the end and side rails can be made separately and welded or otherwise fastened together.

The hammock 12 is made of a suitable, durable and decorative fabric and has a bottom 28, ends 30—30, and sides 32—32. Along the upper edge of the ends and sides the fabric is doubled over to provide elongate, tubular pockets 34—34 and 36—36 for receiving the end and side rails. At the hinge points of the side rails the material of the hammock is cut away at 38—38 to permit the frame to be folded without interference of the material. Because of the size of the bassinet a stiff sheet of composition board b is preferably placed in the bottom of the hammock prior to placing the mattress therein so as to prevent buckling or bending of the mattress, the board $b$ being coextensive with the bottom of the hammock.

The legs 14 are fastened to the side rails of the frame by pivot pins which are in the form of rivets 40 so that the legs may be folded inwardly to substantially parallel relation with the plane of the frame, thus permitting folding the bed to a substantially flat condition when it it desirable to store it away. Toggle braces 42 are connected to the legs and frame to hold the legs in operative position, that is, substantially perpendicular to the plane of the frame when in use or to permit the legs to be collapsed when not in use. Each toggle consists of two elements 44 and 46. The adjacent ends of the elements 44 and 46 are pivotally connected by a rivet 48 and the outer ends by rivets 50 and 52 to the legs and side rails of the frame, respectively. A notch 54 in the element 46 and a dimple 56 in the element 44 interengage when the elements are aligned to hold them aligned. A downward pressure applied at the adjacent ends of the elements will disengage the dimple from the notch to permit collapse of the toggle and hence folding of the legs 14 inwardly.

Each leg 14 is articulated, being comprised of upper and lower sections 58 and 60. The upper section 58 is U-shaped, preferably being formed of one piece of bar stock and has side portions 62—62, the upper ends of which are pivotally connected to the frame, as heretofore described, and a lower portion 63 which extends transversely of the frame substantially parallel to the end rail. The lower section 60 is correspondingly U-shaped, having side portions 64—64 connected by rivets 66—66 to the lower ends of the side portions 62—62, and a lower portion 68 which extends transversely of the frame substantially parallel to the end rail and the portion 62. The upper ends of the side portions 64—64 overlap the lower portions of the side portions 62—62, and locking elements or sleeves 70 are slidably mounted on the side portions 62—62 of the upper sections which may slide down over the overlapping portions to lock them in alignment, thus preventing pivoting of the lower sections with respect to the upper sections. By raising the sleeves 70—70, however, the lower sections are freed so that they may be folded either inwardly or outwardly with respect to the upper sections. A spring clip is fastened to each of the side portions 62 of the upper sections beneath which the sleeve 70 may be slipped to retain it in an inoperative position when it is desired to fold the lower section of the leg.

As illustrated in Fig. 1, the lower sections 60 of the legs 14 are held in alignment with the upper sections 58, and in this position the legs have an overall length adequate to support the bed as a bassinet. By providing the toggles 42 of good length and a good overlap at the junction of the upper and lower leg sections with which the locking sleeves 70 may engage, a very sturdy structure is attained.

Figure 2:
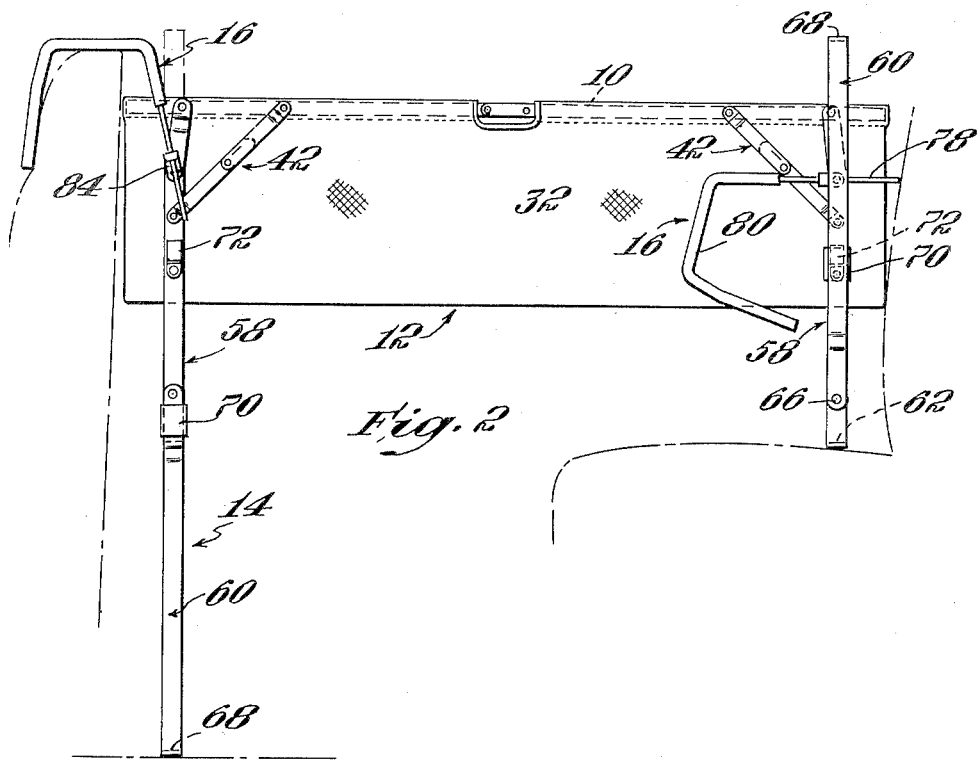
Fig. 2 is a side elevation of the combination bassinet and car bed used as a car bed placed longitudinally of the car.
Figure 3:
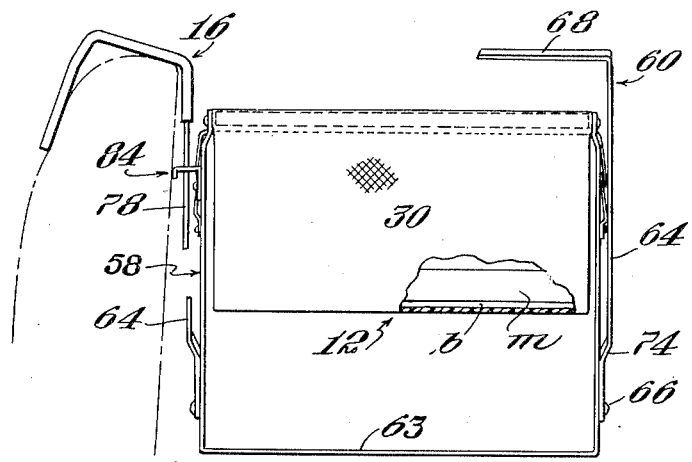
Fig. 3 is an end elevation of the combination bassinet and car bed used as a car bed placed crosswise of the car.

When it is desirable to use the bed in a car, the locking sleeves 70 are raised into engagement with the spring clips 72 and the lower sections of the legs are folded outwardly and upwardly to the positions shown in Figs. 2 and 3. The lower sections 60 are somewhat larger than the upper sections 58 and, when folded upwardly to substantially vertical position, the transverse portions 68 of the lower section will pass over the ends of the frame and form bails or handles which may be used to carry the bed and to lift it about. To permit easy folding the lower sections 60 are widened by bending the side portions 64 outwardly as at 74 so as to clear the upper sections and the spring clips 72. It is apparent that with the lower sections thus folded the bed may be placed on the floor at a lower level with the transverse portions 63 in engagement with the floor.

The bed may be used in a car either longitudinally thereof or crosswise thereof. Fig. 2 shows the bed placed longitudinally. In this position one of the lower leg sections 60 is folded upwardly so that the transverse portion 63 rests on the back seat of the car, the latter being shown in dotted lines and the other lower leg section is retained in its extended position for engagement with the floor of the car between the front and back seats. To provide for additional stability the arms 16 are arranged to engage the back of the front seat which is also shown in dotted lines.

When used crosswise of the car (Fig. 3) both lower leg sections 60 are left folded outwardly and upwardly, and the arms 16 are arranged to engage the back of the front seat to suspend the bed therefrom. The upwardly folded position of the lower leg sections is preferred since the space beneath the bed is then left unobstructed so that persons seated in the back seat will have knee room, although if no one is seated there the legs may be folded inwardly.

The arms 16 are hook-shaped, each having a straight staff-like portion 78 from the upper end of which projects a crook 80, the latter being covered with a rubber tube or the like 82. The arms are fastened to the legs in such fashion that they can be positioned to extend from a side rail to support the bed crosswise of the car or from an end rail so that they can be used to support the bed longitudinally of the car. To this end a bracket member 84 (Fig. 1b) is removably fastened to the upper section 58 of each of the legs 14. As shown the bracket has an attaching leg 86 in which there is a keyhole slot 88 for engagement with a stud 90, in the form of a rivet having an enlarged head, fast to the leg sections 62. An arm 92 projects laterally from the leg and has in it a vertical hole 94 through which the staff 78 is slidable. The lower end of the staff is enlarged or may have a collar made fast thereto so that it will not slip out of the hole altogether. As thus constructed the arm at one corner of the frame may, by pivotal movement about the axis of its staff, be placed so as to extend either at right angles to an end rail, as shown in full lines (Fig. 1b), or at right angles to a side rail, as shown in dotted lines. The other bracket may be placed either at the opposite end of the adjacent side or end rail, depending upon the position in which the bed is to be used and rotated about its staff so as to pair with the first arm. Thus, by leaving one arm attached to one corner of the frame and transferring the other arm diagonally from one corner to the other by transferring the bracket member 84 from one leg to the other, it may be paired with the one arm either for side or end suspension. Instead of using the brackets 84, which are removably attached by keyhole slots, a clamping sleeve 96 may be attached by means of a bolt 98 and wing nut 100 to the upper leg portion 62 (Fig. 1a). While the brackets may be attached below the level of the frame to the leg portions 62 in place of the brackets 84, it is within the scope of the invention to attach them to the side rails or to the end rails and for this purpose bolt holes 101 are formed in the side and end rails. Furthermore, the staffs may have spaced lugs or nubs 102 thereon by which their vertical position may be adjusted.

To sum up, the bed may be used indoors either at conventional height or at a bassinet car bed level and in a car, it can be used either transversely or longitudinally thereof and finally by proper adjustment its legs may be employed as handles for carrying the bed from place to place.

It should be understood that the present disclosure is for the purpose of illustration only and that this invention includes all modifications and equivalents which fall within the scope of the appended claims.

I claim:

1. A combination bassinet and car bed comprising a rectangular frame, a hammock suspended from the frame for reception of a mattress, and legs joined to the frame to support it, said legs having upper and lower sections, the lower sections being longer than the upper sections, means pivotally connecting the upper ends of the lower sections to the lower ends of the upper sections in overlapping relation, said lower sections being foldable from lower positions in alignment with the upper sections upwardly into substantially parallel relation with the upper sections in which position the lower ends of the lower sections extend above the top of the frame and provide handle means for carrying the bed, and the lower ends of the upper sections constitute the footing for the bed, locking sleeves mounted on the upper sections slidable thereon into telescoping engagement with the overlapping portions of the upper and lower sections to hold said sections in rigid alignment for supporting the bed at its maximum height, said sleeves being slidable upwardly along the upper sections to disengage them from the overlapping portions of the legs to permit folding the lower leg sections and retaining clips mounted on the upper sections with which the locking sleeves may be engaged to hold them elevated.

2. A combination bassinet and car bed according to claim 1, wherein the leg sections are U-shaped, the ends of the upper leg sections being pivotally fastened to the side rails of the frame, an articulate toggle brace connected at its ends between each upper section and the frame for pivotally holding the upper leg sections perpendicular to the frame or permitting them to be folded into substantial parallelism therewith, the upper ends of the lower sections engaging the outer sides of the upper sections and having laterally displaced portions which are spaced from and parallel to the upper sections when the lower sections are folded upwardly, said displaced portions providing a clearance for the locking sleeves, retaining clips and toggle braces.

3. A combination bassinet and car bed according to claim 1, wherein the leg sections at the opposite ends of the frame are independently operable so that one may be extended while the other is folded for supporting the bed on surfaces at two different levels.

References Cited in the file of this patent

UNITED STATES PATENTS

| | | |
|---|---|---|
| 1,581,062 | Jones | Apr. 13, 1926 |
| 1,807,234 | Brown | May 26, 1931 |
| 2,029,484 | Howard | Feb. 4, 1936 |
| 2,189,256 | Stahl | Feb. 6, 1940 |
| 2,347,389 | Baker | Apr. 25, 1944 |
| 2,508,822 | Goldberg | May 23, 1950 |
| 2,586,237 | Linden | Feb. 19, 1952 |
| 2,617,119 | Linden | Nov. 11, 1952 |

FOREIGN PATENTS

| | | |
|---|---|---|
| 258,028 | Great Britain | Sept. 16, 1926 |
| 304,807 | Great Britain | Jan. 21, 1929 |
| 433,282 | Great Britain | May 5, 1934 |
| 629,080 | Great Britain | Sept. 9, 1949 |
| 953,381 | France | May 23, 1949 |